(12) United States Patent
Alhems et al.

(10) Patent No.: US 12,378,966 B2
(45) Date of Patent: Aug. 5, 2025

(54) TWO-PHASE LIQUID-GAS FLOW SYSTEM FOR TESTING ELECTRICAL SUBMERSIBLE PUMPS

(71) Applicant: KING FAHD UNIVERSITY OF PETROLEUM AND MINERALS, Dhahran (SA)

(72) Inventors: Luai M. Alhems, Dhahran (SA); Syed M. Shaahid, Dhahran (SA); Aftab Ahmad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 561 days.

(21) Appl. No.: 17/939,565

(22) Filed: Sep. 7, 2022

(65) Prior Publication Data
US 2024/0077081 A1 Mar. 7, 2024

(51) Int. Cl.
*F04D 15/00* (2006.01)
*G01F 1/74* (2006.01)
(Continued)

(52) U.S. Cl.
CPC ..... *F04D 15/0088* (2013.01); *F04D 15/0005* (2013.01); *G01F 1/74* (2013.01);
(Continued)

(58) Field of Classification Search
USPC ........................................................ 700/282
See application file for complete search history.

(56) References Cited

U.S. PATENT DOCUMENTS 11,112,294 B2   9/2021   Ahmad et al.
11,225,979 B2   1/2022   Basha et al.
(Continued)

FOREIGN PATENT DOCUMENTS

CN   104234708 A   *   12/2014
CN   108119351 A   *   6/2018   .............. F04B 51/00
(Continued)

OTHER PUBLICATIONS

Pelikan, "Making a Submersible Pump Test Station" accessed at https://www.thedriller.com/articles/85897-making-a-submersible-pump-test-station Jun. 1, 2001, 5 page print out (Year: 2001).*
(Continued)

*Primary Examiner* — Emilio J Saavedra
(74) *Attorney, Agent, or Firm* — Oblon, McClelland, Maier & Neustadt, L.L.P.

(57) ABSTRACT

A two-phase liquid-gas flow system for testing electrical submersible pumps (ESP) includes an oil pump, a water pump, an oil storage tank, a water storage tank, a pressurized air system, an air pressure regulator (PR), and a transparent test section with the ESP. The pressurized air system includes air storage tanks, compressors, and air flow meters (AFM). The oil pump and the water pump supply oil and water from the oil storage tank and the water storage tank through an oil flow meter and a water flow meter, respectively, to the transparent test section. The air storage tanks are in fluid communication with the PR by valves, which channel air through the PR and the AFMs to the transparent test section. A camera is provided to capture photos and videos of flow patterns of the working fluid in the transparent test section.

19 Claims, 4 Drawing Sheets

(51) Int. Cl.
    *G01F 25/10*      (2022.01)
    *E21B 43/12*      (2006.01)
    *F04D 13/10*      (2006.01)

(52) U.S. Cl.
    CPC ............ *G01F 25/10* (2022.01); *E21B 43/128* (2013.01); *F04D 13/10* (2013.01); *F05D 2270/8041* (2013.01)

(56) References Cited

U.S. PATENT DOCUMENTS

| | | |
|---|---|---|
| 11,255,177 B2 | 2/2022 | Kopecky et al. |
| 2021/0079921 A1* | 3/2021 | Fielder ................ F04D 15/0005 |

FOREIGN PATENT DOCUMENTS

| | | | |
|---|---|---|---|
| CN | 208153007 U | | 11/2018 |
| CN | 111043048 A | * | 4/2020 |

OTHER PUBLICATIONS

Nunez, et al. ; Multiphase Pumping and Measuring Technologies as an Alternative to Conventional Production. ; Innovative Solutions in Flow Measurement and Control—Oil, Water and Gas ; Aug. 28-30, 2017 ; 9 Pages.

\* cited by examiner

GVF = 10%

FIG. 3A

GVF = 30%

FIG. 3B

GVF = 50%

FIG. 3C

GVF = 70%

FIG. 3D

TWO-PHASE LIQUID-GAS FLOW SYSTEM FOR TESTING ELECTRICAL SUBMERSIBLE PUMPS

BACKGROUND

Technical Field

The present disclosure is directed to a testing apparatus for pumps, and particularly, to a liquid-gas flow system for testing electrical submersible pumps under different flow conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Generally, oil wells need some form of artificial lift to enhance flow of fluids from wells when a reservoir has insufficient energy to produce at economic rates or to boost production to improve financial performance. Electrical submersible pumping is considered as one of the most versatile artificial lift methods. An electrical submersible pump (ESP) typically includes multiple centrifugal pump stages mounted in series within a housing mated to a submersible electric motor. The operation of electrical submersible pumps (ESPs) is effective only when handling incompressible liquids. However, a significant amount of free gas is present during oil production. Entrained gas interference can result in performance deterioration such as slugging which degrades the performance of ESPs significantly.

Presently, one of the major challenges faced in the oil industry is the presence of high gas content (gas slugs) in oil wells. Gas slugs tend to reduce electrical submersible pump (ESP) head and lead to under-load shutdowns. The corresponding increase in gas volume fraction (GVF) significantly affects the performance of the pump. To address the above challenge, it is helpful to have prior information about head-degradation and liquid-gas flow behavior. Several gas-liquid flow patterns such as bubbly flow, agglomerated flow, gas-pockets, annular flow, continuous flow, and discontinuous flow may occur. Therefore, a need remains to develop a system that can be utilized to study flow patterns generated at different GVFs and at different flow conditions, and to measure pressure (corresponding to different flow patterns) across the ESP.

Accordingly, it is an object of the present disclosure to provide an electrical submersible pump (ESP) and an apparatus for testing ESPs under different flow conditions and gas volume fractions for multi-phase flow systems.

SUMMARY

In an exemplary embodiment, a multi-phase liquid-gas flow system for testing electrical submersible pumps (ESP) is described. The system includes an oil pump, a water pump, a turbine type oil flow meter (OFM), a turbine type water flow meter (WFM), a temperature sensor, a pressure sensor, an oil-air-water separator tank, an oil storage tank, a water storage tank, a pressurized air system, an air pressure regulator (PR), and a transparent test section, and a test pump section. The test pump section comprises an ESP test pump disposed inside a pipe. The pressurized air system includes at least four air storage tanks (AT) and at least 3 compressors. Each compressor has a dryer (COMP+DRYER). The pressurized air system further includes at least 3 air flow meters (AFM). The oil storage tank is in fluid communication with the oil pump by a first valve, and the oil pump is configured to pump oil from the oil storage tank through the OFM to the transparent test section by a second valve and a third valve. The water storage tank is in fluid communication with the water pump by a fourth valve. The water pump is configured to pump water through the WFM and to the transparent test section by a fifth valve and a sixth valve. The air storage tanks are in fluid communication with the PR by a first plurality of valves. The first plurality of valves is configured to channel air through the PR and the AFMs to the transparent test section by a second plurality of valves. An air stream from the AT is sent to the transparent test section by a seventh valve and an eight valve. The system further includes a camera to capture photos and videos of flow patterns in the transparent test section. The camera is mounted on a rack mounted to the transparent test section and in longitudinal alignment with the transparent test section The ESP is mounted axially with a longitudinal axis of the transparent test section, and the test pump section is mounted downstream of the transparent test section. The ESP has an intake and discharge at least one of which is axially aligned with the transparent test section.

In some embodiments, the first valve, the second valve, the fourth valve, the fifth valve, the seventh valve, and the first plurality of valves are gate valves.

In some embodiments, the third valve, the sixth valve, and the eighth valve are one-way valves.

In some embodiments, the second plurality of valves are flow control valves.

In some embodiments, the transparent test section is a transparent polymer cylinder.

In some embodiments, the transparent test section has a length of from 100 cm to 200 cm.

In some embodiments, the transparent test section has a diameter of from 7.5 cm to 12.5 cm.

In some embodiments, the ESP test pump has a diaphragm and an impulse line.

In some embodiments, the ESP test pump has a length of from 100 cm to 200 cm.

In some embodiments, the ESP test pump has a diameter of from 10 cm to 20 cm.

In some embodiments, the ESP test pump is connected downstream of the transparent test section and is in fluid communication with the transparent test section.

In some embodiments, the ESP test pump is disposed axially with regard to the transparent test section.

In some embodiments, the PR is configured to control an air pressure of the air stream from the AT to the transparent test section to achieve a predetermined gas volume fraction in the transparent test section.

In some embodiments, the system operates at GVFs that range of from 10% to 70% per total volume of a multi-phase liquid-gas flow.

In some embodiments, the ESP test pump has a differential pressure transmitter.

In some embodiments, the impulse line runs from the submersible test pump to the diaphragm through the differential pressure transmitter.

In some embodiments, the transparent test section is a vertically oriented cylinder.

In some embodiments, the temperature sensor and the pressure sensor are disposed adjacent to the transparent test section.

In some embodiments, a diameter of the transparent test section is from 1.1 to 1.5 times greater than a diameter of the test pump section.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the term, "two-phase flow" refers to the interactive flow of two distinct phases with common interfaces in a channel, with each phase representing a mass or volume of matter. The two phases can exist as combinations of solid, gas, and/or liquid phases.

As used herein, the term, "transparent" refers to allowing light to pass through so that objects behind can be distinctly seen. Non-limiting examples of transparent materials include glass, cellophane, and thermoplastics such as polycarbonate and poly(meth)acrylate.

As used herein, the term, "pump" refers to a mechanical device using suction or pressure to raise or move liquids or compress gases.

As used herein, the term, "flow meter" or "flow sensor" refers to an instrument used to measure linear, nonlinear, mass or volumetric flow rate of a liquid or a gas.

As used herein, the term, "valve" refers to a device that regulates, directs or controls the flow of a fluid (gases, liquids, fluidized solids, or slurries) by opening, closing, or partially obstructing various passageways.

Aspects of the present disclosure are directed to a two-phase gas-liquid flow system for testing an electrical submersible pump (ESP) under different gas and flow conditions. Specifically, the system can be utilized for measuring a pressure increment across the ESP and to study two-phase flow behavior at an inlet of the ESP at different operating conditions. The system includes an oil pump, a water pump, a turbine type oil flow meter, a turbine type water flow meter, a temperature sensor and a pressure sensor, an oil-air-water separator tank, an oil storage tank, a water storage tank, multiple valves such as gate valves, one-way valves, and flow control valves, a pressurized air system including multiple air storage tanks, compressors, dryers, and air flow meters, an air pressure regulator, and a transparent test section containing the ESP. All the components are connected through piping system and the valves.

In some embodiments, the pipes of the piping system are constructed of steel, metal, polyvinyl chloride, stainless steel, plastic, copper, carbon steel, iron, cast iron, thermoplastic, metal alloys, or the like. In some embodiments, the pipes have an inner diameter that ranges from 0.25 inches (in.) to 20 inches, preferably 1 in. to 19 in., preferably 2 in. to 18 in., preferably 3 in. to 17 in., preferably 4 in. to 16 in., preferably 5 in. to 15 in., preferably 6 in. to 14 in., preferably 7 in. to 13 in., preferably 8 in. to 12 in., preferably 9 in. to 11 in., or 10 inches. In some embodiments, the pipes have an outer diameter of 0.5 in. to 25 in., preferably 1 in. to 24 in., preferably 2 in. to 23 in., preferably 3 in. to 22 in., preferably 4 in. to 21 in., preferably 5 in. to 20 in., preferably 6 in. to 19 in., preferably 7 in. to 18 in., preferably 8 in. to 17 in., preferably 9 in. to 16 in., preferably 10 in. to 15 in., preferably 11 in. to 14 in., preferably 12 in. to 13 in., or 12.5 inches.

The outcome of ESP testing obtained by using the system includes pressure increment measurement across the ESP (difference between delivery pressure at an outlet of the ESP and intake pressure at an inlet of the transparent test section) and flow visualization at the inlet of the ESP for different flow conditions. The two-phase gas-liquid flow behavior at the inlet of the ESP is visualized in the transparent test section of the system. The gas and liquid flow patterns are observed or analyzed from photos and videos taken using high-speed cameras. The tests can be carried out at different liquid flow rates, different gas volume fractions (GVF), different inlet pressures, and for various inclinations for a given rotational speed of the ESP. The working fluids for two-phase liquid-gas flow include water-gas and oil-gas.

Figure 1:
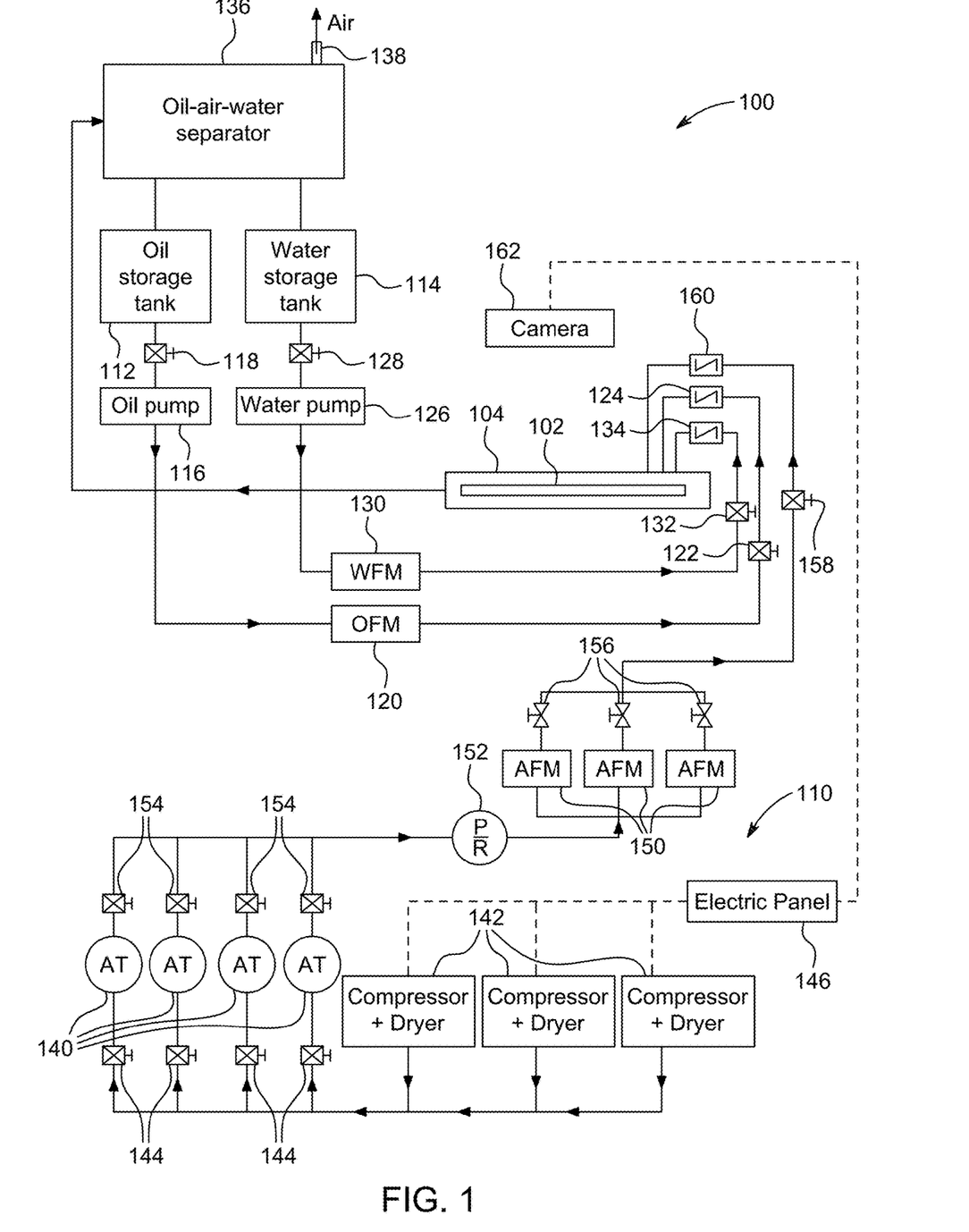
FIG. 1 is a schematic layout of a two-phase liquid-gas flow system used for testing an electrical submersible pump (ESP), according to certain embodiments.

Referring to FIG. 1, a schematic layout of a two-phase liquid-gas flow system 100 used for testing an electrical submersible pump (ESP) 102 is illustrated, according to an embodiment of the present disclosure. The two-phase liquid-gas flow system 100, hereinafter referred to as the system 100, is used for testing the ESP 102 under different flow conditions of a working fluid. In some embodiments, the working fluid is included in multiphase systems. In some embodiments, the working fluid may include water-gas and oil-gas. In alternate embodiments, the working fluid may be any combination of viscous fluids, such as acetone, methanol, ethanol, mercury, glycerin, honey, ink, glue, soap, lubricants, butane, pentane, blood, oleic acid, pitch, hydrogen, etc. The different flow conditions may include, but are not limited to, liquid flow rates, gas volume fractions (GVFs), inlet pressure and inclinations for a given rotational speed of the ESP 102. In some embodiments, the ESP 102 can accommodate flow rates ranging from 1,000 $m^3$/hour (hr) to 250,000 $m^3$/hr, preferably 10,000 $m^3$/hr to 225,000 $m^3$/hr, preferably 25,000 $m^3$/hr to 200,000 $m^3$/hr, preferably 50,000 $m^3$/hr to 175,000 $m^3$/hr, preferably 75,000 $m^3$/hr to 150,000 $m^3$/hr, preferably 100,000 $m^3$/hr to 125,000 $m^3$/hr, or 112,500 $m^3$/hr. In some embodiments, the ESP 102 can accommodate pressures ranging from 100 pounds per square inch (psi) to 10,000 psi, preferably 1,000 psi to 9,000 psi, preferably 2,000 psi to 8,000 psi, preferably 3,000 psi to 7,000 psi, preferably 4,000 psi to 6,000 psi, or 5,000 psi. In some embodiments, the ESP 102 can rotate at speeds ranging from 100 rotations per minute (rpm) to 10,000 rpm, preferably 1,000 rpm to 9,000 rpm, preferably 2,000 rpm to 8,000 rpm, preferably 3,000 rpm to 7,000 rpm, preferably 4,000 rpm to 6,000 rpm, or 5,000 rpm.

The system 100 includes a transparent test section 104 and a test pump section 106 with an ESP test pump 210 (shown in FIG. 2) and a pressurized air system 110 in fluid communication with the transparent test section 104. In some embodiments, the transparent test section 104 can be configured vertically, horizontally, diagonally, slanted, or otherwise angled within the system. In some embodiments, a flow path around the test pump section disposed proximal the transparent test section 104 is at least equal to a flow path in the transparent test section 104. The flow path can be defined as the direction that a liquid stream runs through each respective section in terms of a volumetric flow rate. In essence, during operation the volumetric flow rate through ESP in the test pump section is practically equal to the volumetric flow rate through the transparent test section 104 itself. In some embodiments, the volumetric flow rate may be 10 gallons/hour through each respective section, preferably 200 gallons/hr, preferably 300 gallons/hr, preferably 400 gallons/hr, or 500 gallons/hr. In some embodiments, a diameter of the transparent test section is from 1.1 to 1.5 times greater than a diameter of the test pump section, preferably 1.2 to 1.4 times greater, or 1.3 times greater. As depicted in FIG. 1, the transparent test section 104 encompasses the entire diameter of the test pump section with the ESP 102. The system 100 further includes an oil storage tank 112 and a water storage tank 114 in fluid communication with the transparent test section 104. In some embodiments, the oil storage tank 112 can accommodate a volume of 10 gallons to 1,000 gallons, preferably 100 gallons to 900 gallons, preferably 200 gallons to 800 gallons, preferably 300 gallons to 700 gallons, preferably 400 gallons to 600 gallons, or 500 gallons. In some embodiments, the water storage tank 114 can accommodate a volume of 10 gallons to 1,000 gallons, preferably 100 gallons to 900 gallons, preferably 200 gallons to 800 gallons, preferably 300 gallons to 700 gallons, preferably 400 gallons to 600 gallons, or 500 gallons. In some embodiments, the oil tank 112 and water tank 114 have the shape of a cylinder, a rectangle, a triangle, a funnel, or any polygon. As such, the transparent test section 104 having the ESP test pump 106 is fluidly coupled with oil, water, and gas such as pressurized air. The oil storage tank 112 is configured to store oil required for testing the ESP 102 and an oil pump 116 is disposed in fluid communication with the oil storage tank 112. A first valve 118 is disposed in fluid communication with the oil storage tank 112 and the oil pump 116. In some embodiments, the first valve 118 is a gate valve. In some embodiments, the oil pump 116 can direct upwards of 10 gallons/hour through the first valve 118, preferably 200 gallons/hr, preferably 300 gallons/hr, preferably 400 gallons/hr, or 500 gallons/hr. The gate valve may be, otherwise, defined as a control valve that is configured to either allow flow of fluid or restrict flow of fluid therethrough. In some embodiments, the gate valve may be actuated manually, pneumatically, or electrically based on the application of the system 100. The system 100 further includes a turbine type oil flow meter (OFM) 120 disposed in fluid communication with the oil pump 116 and the transparent test section 104. In some embodiments, the flow meters are centripetal, magnetic, ultrasonic, or vortex flow meters. The turbine type flow meter can be described by the use of mechanical energy of the liquid to rotate a rotor within the flow stream and that the rotational speed is directly proportional to the velocity of the fluid traveling through the meter. The turbine type oil flow meter 120, in the present disclosure, is used for measuring flow rate of oil flowing therethrough. The oil flow meter 120 has an accuracy of ±10% of the actual flow rate, preferably ±8%, preferably ±6%, preferably ±4%, preferably ±2%, preferably ±1%, preferably ±0.5%, or ±0.25%. The turbine type oil flow meter 120 is further fluidly communicated to the transparent test section 104 using a second valve 122 and a third valve 124. In some embodiments, the second valve 122 is a gate valve. In some embodiments, the third valve 124 is a one-way valve. The one-way valve is otherwise known as check valve which allows flow of fluids in one direction. As such, the third valve 124 allows flow of oil from the oil storage tank 112 to the transparent test section 104 and restricts return flow of the oil. i.e., restricts flow of oil from the transparent test section 104 to the oil storage tank 112. With this arrangement, the oil pump 116 in fluid communication with the oil storage tank 112 is configured to pump oil from the oil storage tank 112 through the OFM 120 and to the transparent test section 104 by the second valve 122 and the third valve 124.

The water storage tank 114 is configured to store water required for testing the ESP 102 and a water pump 126 is disposed in fluid communication with the water storage tank 114. In some embodiments, the water pump 126 can direct upwards of 10 gallons/hour through the first valve 128, preferably 200 gallons/hr, preferably 300 gallons/hr, preferably 400 gallons/hr, or 500 gallons/hr. A fourth valve 128 is disposed in fluid communication with the water storage tank 114 and the water pump 126. In some embodiments, the fourth valve 128 is a gate valve. The system 100 further includes a turbine type water flow meter (WFM) 130 disposed in fluid communication with the water pump 126 and the transparent test section 104. The turbine type water flow meter 130, in the present disclosure, is used for measuring flow rate of water flowing therethrough. The water flow meter 130 has an accuracy of ±10% of the actual flow rate, preferably ±8%, preferably ±6%, preferably ±4%, preferably ±2%, preferably ±1%, preferably ±0.5%, or ±0.25%. The turbine type water flow meter 130 is further fluidly communicated to the transparent test section 104 using a fifth valve 132 and a sixth valve 134. In some embodiments, the fifth valve 132 is a gate valve. In some embodiments, the sixth valve 134 is a one-way valve. As such, the sixth valve 134 allows flow of water from the water storage tank 114 to the transparent test section 104 and restricts return flow of the water. i.e., restricts flow of water from the transparent test section 104 to the water storage tank 114. With this arrangement, the water pump 126 in fluid communication with the water storage tank 114 is configured to pump water from the water storage tank 114 through the WFM 130 and to the transparent test section 104 by the fifth valve 132 and the sixth valve 134.

The system 100 further includes an oil-air-water separator tank 136 in fluid communication with the transparent test section 104, the oil storage tank 112, and the water storage tank 114. The oil-air-water separator tank 136 is configured to receive a fluid mixture from the transparent test section 104. The fluid mixture may be air-water, air-oil, or water-oil. In alternate embodiments, the fluid mixture may be any combination of viscous fluids, such as acetone, methanol, ethanol, mercury, glycerin, honey, ink, glue, soap, lubricants, butane, pentane, blood, oleic acid, pitch, hydrogen, etc. In some embodiments, the oil-air-water separator tank 136 can accommodate a volume of 10 gallons to 3,000 gallons, preferably 200 gallons to 2800 gallons, preferably 400 gallons to 2600 gallons, preferably 600 gallons to 2400 gallons, preferably 800 gallons to 2200 gallons, preferably 1000 gallons to 2000 gallons, preferably 1200 gallons to 1800 gallons, preferably 1400 gallons to 1600 gallons, or 1500 gallons. The oil-air-water separator tank 136 includes an air vent 138 such that the air contained in the fluid mixture received within the oil-air-water separator tank 136 is discharged to the atmosphere and the liquids such as the water and the oil are separated and discharged to the water storage tank 114 and the oil storage tank 112, respectively. In alternate embodiments, the air vent 138 is a bleed valve. In some embodiments, the air vent can release air into the atmosphere upwards of 20 gallons/hour, preferably 100 gallons/hr, preferably 200 gallons/hr, preferably 300 gallons/hr, preferably 400 gallons/hr, or 500 gallons/hr. The oil-air-water separator tank 136 is positioned above the water storage tank 114 and the oil storage tank 112 such that the separated water and oil are stored in the water storage tank 114 and the oil storage tank 112, respectively, through gravity. In alternate embodiments, the oil-air-water separator tank 136 is positioned below the water storage tank 114 and the oil storage tank 112, or parallel to the water storage tank 114 and the oil storage tank 112.

The pressurized air system 110 includes a plurality of air storage tanks (AT) 140 in fluid communication with the transparent test section 104. In some embodiments, an individual air storage tank 140 can accommodate a volume of 10 gallons to 1,000 gallons, preferably 100 gallons to 900 gallons, preferably 200 gallons to 800 gallons, preferably 300 gallons to 700 gallons, preferably 400 gallons to 600 gallons, or 500 gallons. In some embodiments, the pressurized air system 110 includes four air storage tanks 140, preferably 5 tanks, preferably 6 tanks, preferably 7 tanks, preferably 8 tanks, preferably 9 tanks, or 10 tanks. Particularly, the plurality of air storage tanks 140 is parallelly coupled to each other to fluidly communicate with the transparent test section 104. In alternate embodiments, the plurality of air storage tanks can be ordered descendingly, ascendingly, or any other non-linear array. The plurality of air storage tanks 140 is further fluidly communicated with a plurality of compressors 142. In some embodiments, the pressurized air system 110 includes three compressors 142, preferably 5 compressors, preferably 6 compressors, preferably 7 compressors, preferably 8 compressors, preferably 9 compressors, or 10 compressors. In some embodiments, each of the plurality of compressors has a dryer, totaling 3 dryers, preferably 5 dryers, preferably 6 dryers, preferably 7 dryers, preferably 8 dryers, preferably 9 dryers, or 10 dryers. The plurality of compressors 142 is parallelly coupled to each other to fluidly communicate with the plurality of air storage tanks 140 via a plurality of gate valves 144. In the present disclosure, the plurality of compressors 142 is fluidly communicated to each of the plurality of air storage tanks 140 via each of the plurality of gate valves 144. In some embodiments, the plurality of compressors 142 may be fluidly communicated to each of the plurality of air storage tanks 140 via a single gate valve. The plurality of compressors 142 is further communicated to an electric panel 146. In some embodiments, the electric panel 146 may include a controller (not shown) to control operations of the compressors 142 and dryers. In some embodiments, the controller is a integrated circuit card, video RAM, network interface card, WAN interface card, flash controller, application delivery controller, baseboard management controller, session border controller, primary domain controller, etc.

The pressurized air system 110 further includes a plurality of air flow meters (AFM) 150 disposed in fluid communication with the plurality of air storage tanks 140 and the transparent test section 104. The air flow meter 150 has an accuracy of ±10% of the actual flow rate, preferably ±8%, preferably ±6%, preferably ±4%, preferably ±2%, preferably ±1%, preferably ±0.5%, or ±0.25%. In some embodiments, the pressurized air system 110 includes three air flow meters 150, preferably 4 meters, preferably 5 meters, preferably 6 meters, preferably 7 meters, preferably 8 meters, preferably 9 meters, or 10 meters. The plurality of air flow meters 150 is parallelly coupled to each other to fluidly communicate with the plurality of air storage tanks 140 and the transparent test section 104.

The system 100 further includes an air pressure regulator (PR) 152 disposed in fluid communication with the plurality of air flow meters 150 and the plurality of air storage tanks 140 via a first plurality of valves 154. In some embodiments, the first plurality of valves 154 are gate valves. The air pressure regulator 152 is configured to control pressure of air flowing from the plurality of air storage tanks 140 to the plurality of air flow meters 150. In some embodiments, the air pressure regulator 152 can regulate pressures ranging from 100 pounds per square inch (psi) to 5,000 psi, preferably 500 psi to 4,500 psi, preferably 750 psi to 4,250 psi, preferably 1,000 psi to 4,000 psi, preferably 1,250 psi to 3,750 psi, preferably 1,500 psi to 3,500 psi, preferably 1,750 psi to 3,250 psi, preferably 2,000 psi to 3,000 psi, preferably 2,250 psi to 2,750 psi, or 2,500 psi. Further, the first plurality of valves 154 is configured to channel air through the PR 152 and the AFMs 150 to the transparent test section 104 by a second plurality of valves 156. In some embodiments, the second plurality of valves 156 are flow control valves. Generally, a flow control valve is used to control flow of fluid flowing therethrough. In the present disclosure, the second plurality of valves 156 is used to control flow of air flowing from the air flow meters 150 to the transparent test section 104. The air sent to the transparent test section 104 uses a seventh valve 158 and an eighth valve 160. In some embodiments, the seventh valve 158 is a gate valve. In some embodiments, the eighth valve 160 is a one-way valve.

The system 100 further includes a camera 162 configured to capture photos and videos of flow patterns of the working fluid in the transparent test section 104. In some embodiments, the camera 162 may be in communication with the electric panel 146. The controller of the electric panel 146 may be configured to operate the camera 162 to capture the photos and/or videos of the flow patterns of the working fluid flowing through the transparent test section 104 during testing of the ESP 102. In some embodiments, the camera 162 can capture up to at least 10 images per hour, preferably at least 20 images/hour, preferably at least 30 images/hour, preferably at least 40 images/hour, preferably at least 50 images/hour, or at least 60 images/hour. In some embodiments, the camera 162 may capture at least 5 videos per hours, preferably at least 10 video/hour, preferably at least 15 videos/hour, preferably at least 20 videos/hour, preferably at least 25 videos/hour, or at least 30 videos/hour. In some embodiments, the camera 162 is directly adjacent to the transparent test section 104. In some embodiments, the lens of the camera 162 is in direct contact with the flow in the transparent test section 104. In some embodiments, the background on the opposite side of the transparent test section 104 is an opaque surface or sheet to capture more precise images against the contrast of the opaque color. In some embodiments, the background on the opposite side of the transparent test section 104 is a strobe light to help identify the GVF more easily with the images captured. In some embodiments, the camera 162 is external to the transparent test section 104 and can be mounted in place by a camera stand to take the images and videos. In some embodiments, the camera 162 is mounted on a sliding metal rail external to the transparent test section 104 such that the camera 162 can easily be repositioned by sliding across the metal rail. In some embodiments, the sliding metal rail is aluminum, copper, steel, iron, nickel, or a combination of the like. The sliding metal rail extends from a first end (inlet) of the transparent section 104 to a second end (outlet) of the transparent test section 104 to capture photos of the respective flow rates at each position.

Figure 2:
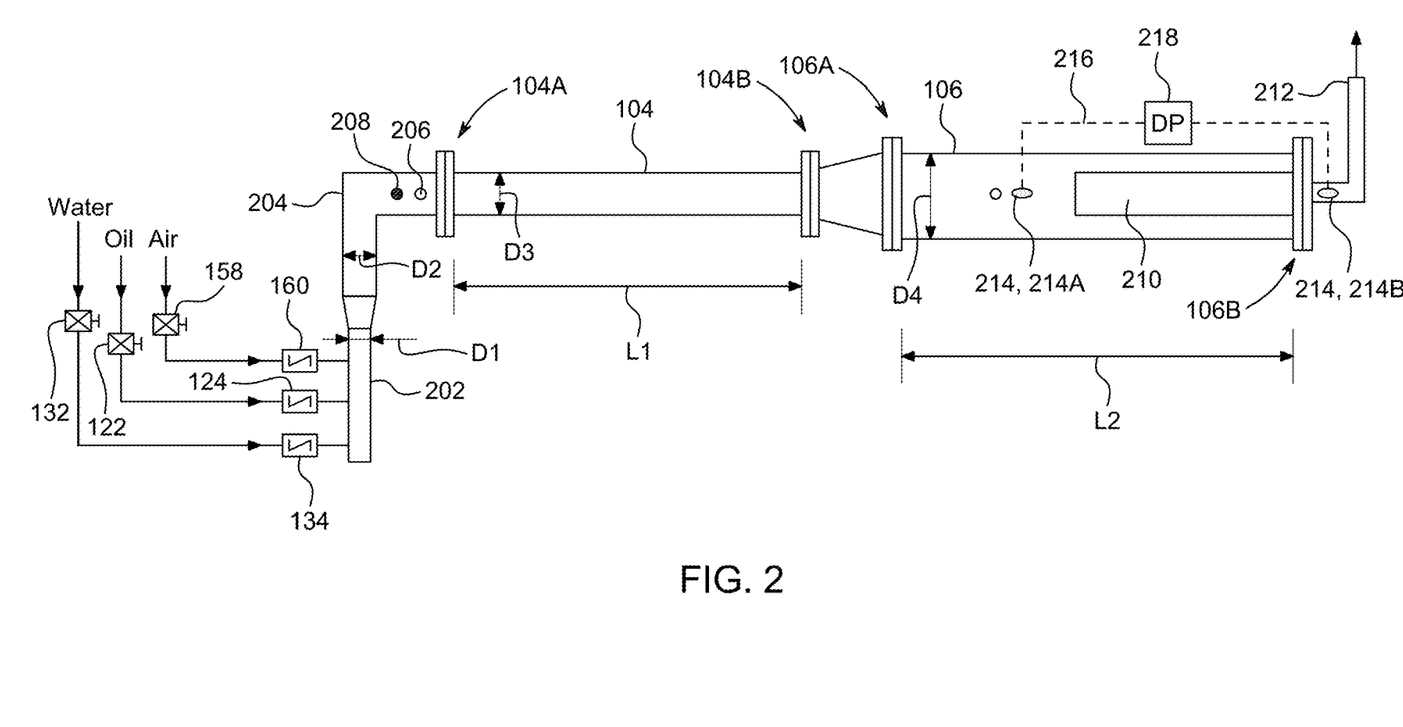
FIG. 2 is a schematic block diagram of a transparent test section along with the ESP of the system of FIG. 1, according to certain embodiments.
Figure 3A:
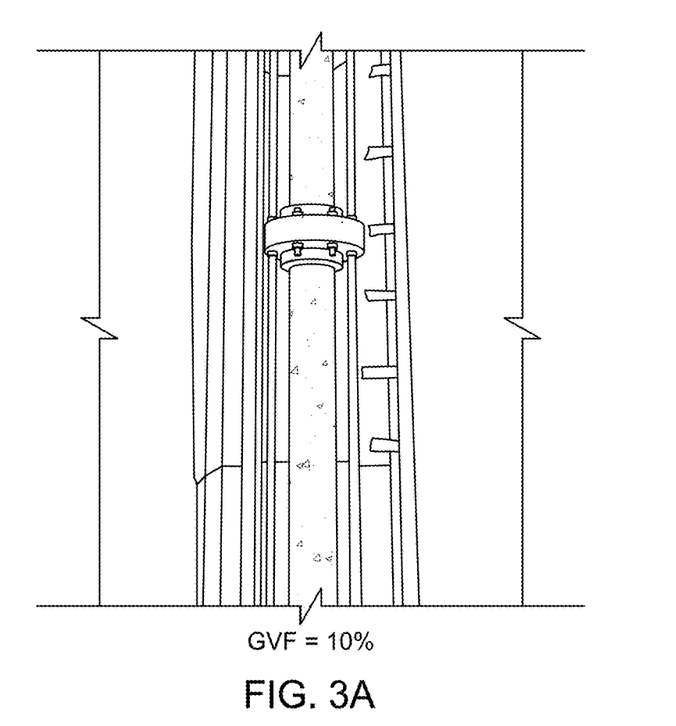
FIGS. 3A, 3B, 3C and 3D show two-phase air-water flow patterns at different gas volume fractions (GVFs) 10%, 30%, 50%, and 70%, respectively, for a vertical flow loop position, according to certain embodiments.
Figure 3B:
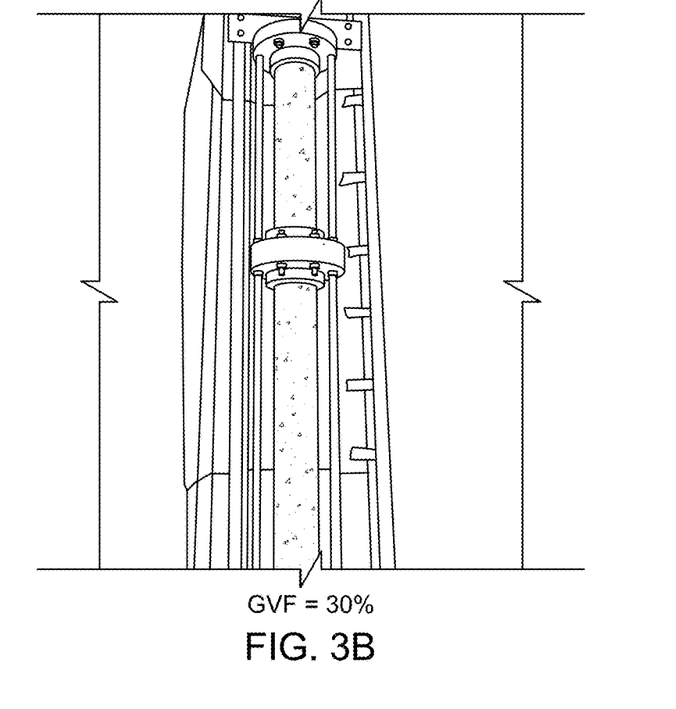
Figure 3C:
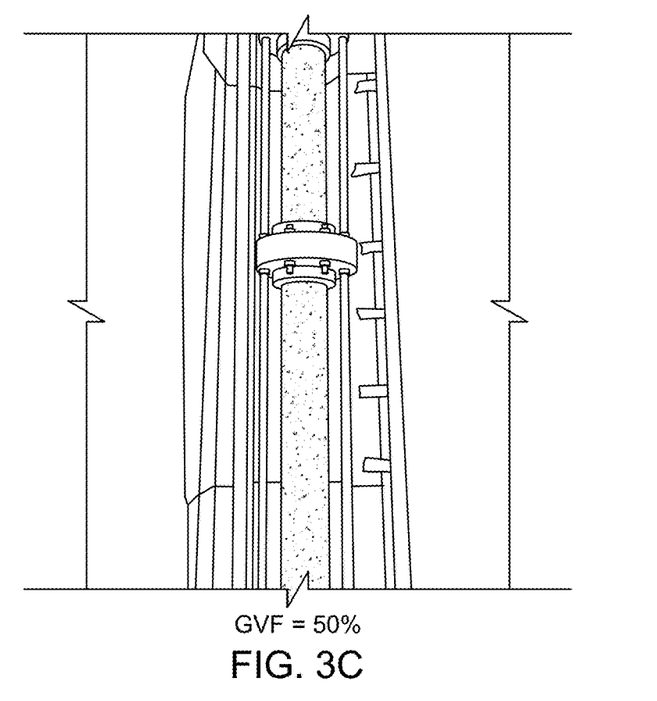
Figure 3D:
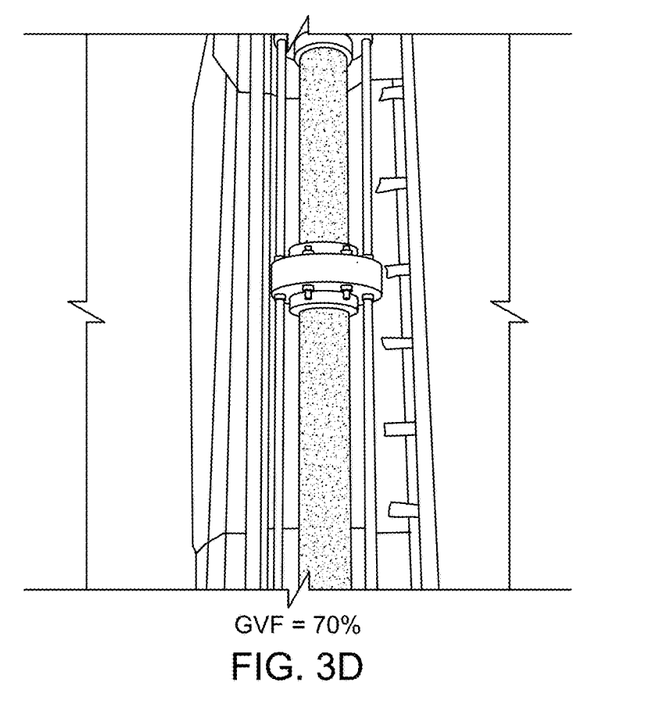

Referring to FIG. 2, a schematic block diagram of the transparent test section 104 which is upstream of a test pump section with the ESP test pump 106 is illustrated, according to certain embodiments. Referring to FIG. 1 and FIG. 2, water line, oil line and gas (or air) line are fluidly coupled to a first conduit 202 having a first outer diameter 'D1'. In an exemplary embodiment, the first outer diameter 'D1' of the first conduit 202 is 5.0 cm. In some embodiments, D1 is 5.25 cm, preferably 5.5 cm preferably 5.75 cm, preferably 6 cm, preferably 4.75 cm, preferably 4.5 cm, preferably 4.25 cm, or 4 cm. The first conduit 202 is further fluidly coupled to a second conduit 204 having a second outer diameter 'D2'. The second conduit 204 has a L-shape bend and the second outer diameter 'D2' thereof is greater than the first outer diameter 'D1' of the first conduit 202. In an exemplary embodiment, the second outer diameter 'D2' of the first conduit 202 is 10.0 cm. In some embodiments, D1 is 10.5 cm, preferably 11 cm preferably 11.5 cm, preferably 12 cm, preferably 9.5 cm. preferably 9 cm, preferably 8.5 cm, or 8 cm. In some embodiments, the ratio of D2 to D1 is 2:1, preferably 2.5:1, preferably 3:1, preferably 3.5:1, or 4:1.

The second conduit 204 is configured to support a temperature sensor 206 and a pressure sensor 208 of the system 100. In some embodiments, the temperature sensor 206 and the pressure sensor 208 may be communicated with the controller of the electric panel 146. The temperature sensor 206 and the pressure sensor 208 are configured to generate signals indicative of a temperature and a pressure, respectively, of the working fluid flowing through the transparent test section 104. The controller in communication with the temperature sensor 206 and the pressure sensor 208 may generate a temperature value and a pressure value, respectively, and display the values in a display (not shown). In some embodiments, the temperature sensor detects temperature values in a range from 25° F. to 400° F., preferably 50° F. to 375° F., preferably 75° F. to 350° F., preferably 100° F. to 325° F., preferably 125° F. to 300° F., preferably 150° F. to 275° F., preferably 175° F. to 250° F., preferably 200° F. to 225° F., preferably 212.5° F. In some embodiments, the pressure sensor detects pressure values in a range from 100 psi to 5,000 psi, preferably 300 psi to 4,800 psi, preferably 500 psi to 4,600 psi, preferably 700 psi to 4,400 psi, preferably 900 psi to 4,200 psi, preferably 1,100 psi to 4,000 psi, preferably 1,300 psi to 3,800 psi, preferably 1,500 psi to 3,600 psi, preferably 1,700 psi to 3,400 psi, preferably 1,900 psi to 3,200 psi, preferably 2,100 psi to 3,000 psi, preferably 2,300 psi to 2,800 psi, or 2,500 psi.

The second conduit 204 is further fluidly coupled to a third conduit 104, which is alternatively referred to as the transparent test section 104, having a diameter, which is otherwise known as the third outer diameter 'D3'. In some embodiments, the transparent test section 104 is inclined vertically. The transparent test section 104 has a first end 104A and a second end 104B defining a length 'L1'. Particularly, the first end 104A of the transparent test section 104 is fluidly coupled to the second conduit 204. In an exemplary embodiment, the length 'L1' of the transparent test section 104 is from 100 cm to 200 cm, preferably 110 cm to 190 cm, preferably 120 cm to 180 cm, preferably 130 cm to 170 cm, preferably 140 cm to 160 cm, or 150 cm. In some embodiments, the length 'L1' of the transparent test section 104 is 180 cm. In an exemplary embodiment, the third outer diameter 'D3' of the transparent test section 104 is from 7.5 cm to 12.5 cm, preferably 8 cm to 12 cm, preferably 8.5 cm to 11.5 cm, preferably 9 cm to 11 cm, preferably 9.5 cm to 10.5 cm, or 10 cm. In some embodiments, the transparent test section 104 is a plexiglass. In some embodiments, the transparent test section 104 is glass, cellophane, diamond, or plastic. In some embodiments, the pressure sensor 208 and the temperature sensor 206 may be disposed within the transparent test section 104. In some embodiments, the first end 104 A and the second end 104B are fixedly screwed or mounted to the second conduit 204 and the ESP test pump 106 respectively. In some embodiments, the temperature sensor 206 and temperature sensor are disposed adjacent to the transparent test section 104 at the first end 104A. In alternate embodiments, there is a second temperature sensor and a second pressure sensor disposed at the end 104B to measure the outlet conditions from the transparent test section 104.

The third conduit 104 (or the transparent test section) is further fluidly coupled to a fourth conduit 106, which is alternatively referred to as the ESP test pump 106, having a diameter, which is otherwise known as the fourth outer diameter 'D4'. The ESP test pump 106 has a first end 106A and a second end 106B defining a length 'L2'. Particularly, the first end 106A of the fourth conduit 106 is coupled to the second end 104B of the third conduit 104 as such the ESP test pump 106 is connected downstream of the transparent test section 104. Further, the ESP test pump 106 is disposed axially with regard to the transparent test section 104. In other words, a central axis of each of the transparent test section 104 and the ESP test pump 106 may be coaxial to each other. In an exemplary embodiment, the length 'L2' of the ESP test pump 106 is from 100 cm to 200 cm, preferably 110 cm to 190 cm, preferably 120 cm to 180 cm, preferably 130 cm to 170 cm, preferably 140 cm to 160 cm, or 150 cm. In some embodiments, the length 'L2' of the ESP test pump 106 is 185 cm. In an exemplary embodiment, the fourth outer diameter 'D4' of the ESP test pump 106 is from 10 cm to 20 cm, preferably 11 cm to 19 cm, preferably 12 cm to 18 cm, preferably 13 cm to 17 cm, preferably 14 cm to 16 cm, or 15 cm. In some embodiments, the fourth outer diameter 'D4' of the ESP test pump 106 is 17.8 cm.

The ESP test pump 106 includes a submersible test pump 210. The submersible test pump 210 is disposed within the ESP test pump 106. Particularly, the submersible test pump 210 is supported at the second end 106B of the ESP test pump 106. Further, the submersible test pump 210 is axially disposed within the ESP test pump 106. A discharge conduit 212 is coupled to the second end 106B of the ESP test pump 106 such that the submersible test pump 210 discharges the working fluid through the discharge conduit 212. The discharge conduit 212 has a L-shape. In some embodiments, the discharge conduit may be linear, diagonal, or slanted. In some embodiments, the discharge conduit may discharge at a rate upwards of 10 gallons/hour through preferably 20 gallons/hr, preferably 40 gallons/hr, preferably 60 gallons/hr, preferably 80 gallons/hour, or 510 gallons/hr. The discharge conduit 212 is configured fluidly communicate with the oil-air-water separator tank 136 such that the discharge conduit 212 is configured to discharge the working fluid (or the fluid mixture) to the oil-air-water separator tank 136. The fluid mixture may be combination of air and oil, air and water, or oil and water. The ESP test pump 106 includes one or more diaphragms 214 disposed adjacent the submersible test pump 210. Diaphragms or diaphragm seals are designed to seal enclosures within these delicate instruments, separating them from dangerous media, especially from pressure-related disturbances. In some embodiments, the diaphragms are constructed of metal, plastic, polymers, or alloys. In some embodiments, the diaphragms have a diameter of 1 cm to 10 cm, preferably 2 cm to 9 cm, preferably 3 cm to 8 cm, preferably 4 cm to 7 cm, preferably 5 cm to 6 cm, or 5.5 cm. In some embodiments, the ESP test pump 106 includes a first diaphragm 214A disposed at an inlet of the submersible test pump 210 and a second diaphragm 214B disposed at an outlet of the submersible test pump 210. Particularly, the second diaphragm 214B is disposed at the discharge conduit 212. The ESP test pump 106 further includes an impulse line 216 (or a sensing line) having one end coupled to the first diaphragm 214A and another end coupled to the second diaphragm 214B. In some embodiments, the length between the first diaphragm 214A and the second diaphragm 214B is at most 0.5 times the length L2, preferably 0.55 times L2, preferably 0.6 times L2, preferably 0.65 times L2, preferably 0.7 times L2, preferably 0.75 times L2, or 0.8 times L2. The ESP test pump 106 has a differential pressure transmitter (DP) 218 disposed in the impulse line 216. Particularly, the impulse line 216 runs from the submersible test pump 210 to the diaphragms 214 through the differential pressure transmitter 218. The differential pressure transmitter 218 along with the first and second diaphragms 214A, 214B together configured to generate a signal indicative of a pressure difference across the submersible test pump 210 through the impulse line 216. In some embodiments, the impulse line is constructed of copper, iron, steel, carbon steel, cobalt, aluminum, alloys, etc. In some embodiments, the impulse line 216 has an outer diameter of from 0.1 cm to 2 cm, preferably 0.2 cm to 1.8 cm, preferably 0.4 cm to 1.6 cm, preferably 0.6 cm to 1.4 cm, preferably 0.8 cm to 1.2 cm, or 1 cm. In some embodiments, the differential pressure transmitter (DP) 218 may be in communication with the controller of the electric panel 146 such that the controller may generate a pressure difference value based on the signal. In some embodiments, the pressure difference value may be displayed in the display. In some embodiments, the differential pressure transmitter 218 may be replaced with a gauge pressure transmitter, an absolute transmitter, or a multivariable pressure transmitter. In some embodiments, the differential pressure transmitter 218 may measure and transmit pressure signals ranging from 100 psi to 5,000 psi, preferably 300 psi to 4,800 psi, preferably 500 psi to 4,600 psi, preferably 700 psi to 4,400 psi, preferably 900 psi to 4,200 psi, preferably 1,100 psi to 4,000 psi, preferably 1,300 psi to 3,800 psi, preferably 1,500 psi to 3,600 psi, preferably 1,700 psi to 3,400 psi, preferably 1,900 psi to 3,200 psi, preferably 2,100 psi to 3,000 psi, preferably 2,300 psi to 2,800 psi, or 2,500 psi.

Referring to FIGS. 3A-3D, two-phase air-water flow patterns at different gas volume fractions (GVFs) for vertical flow loop position are illustrated, according to certain embodiments. In some embodiments, liquid flow rate of the system 100 is at least 1250 barrels per day (bpd), preferably at least 1300 bpd, preferably at least 1400 bpd, preferably at least 1500 bpd, preferably at least 1600 bpd, preferably at least 1700 bpd, preferably at least 1800 bpd, preferably at least 1900 bpd, or at least 2000 bpd. In some embodiments, the barrel has a volume of at least 25 gallons, preferably at least 30 gallons, preferably at least 35 gallons, preferably at least 40 gallons, preferably at least 45 gallons, or at least 50 gallons. As shown in FIGS. 3A-3D, the two-phase liquid-gas flow system 100 is developed to study the effect of GVF on the liquid-gas two-phase flow behavior at the inlet of the ESP 102 at different flow conditions. In some embodiments, the system 100 operates at GVFs that range from 10% to 70%, preferably 15% to 65%, preferably 20% to 60%, preferably 25% to 55%, preferably 30% to 50%, preferably 35% to 45%, or 40%. Particularly, FIGS. 3A, 3B, 3C, and 3D illustrate the two-phase liquid-gas flow at GVF 10%, 30%, 50%, and 70%, respectively. The experimental test yields information including pressure-data (corresponding to different flow patterns) across the ESP 102 and the liquid-gas flow-behavior at the inlet of the ESP 102 for different operating conditions. In some embodiments, the system 100 can operate at different liquid flow rates, different GVFs, different inlet pressures, and for various inclinations for the given rotational speed of the ESP 102. The visualization of gas and liquid flow patterns is done through photos/videos taken by using the camera 162. As per the research study (based on variations in flow rates), several gas-liquid flow patterns such as bubbly flow, agglomerated flow, gas-pockets, annular flow, continuous flow, and discontinuous flow are evidenced. As an illustration of the developed multi-phase liquid-gas flow system 100, captured still photos of the gas-liquid flow patterns for 1250 bpd with different GVFs for 90 degrees inclination (as visualized in the plexiglass transparent test section 104) are shown in FIGS. 3A-3D. As seen in FIGS. 3A-3D, the bubble density increases with increase in GVF.

According to the present disclosure, the two-phase liquid-gas flow system 100 has been designed and developed for testing electrical submersible pumps (ESP) 102 under different gassy and flow conditions such as different liquid flow rates, different gas volume fractions (GVF), different inlet pressures, and for various inclinations for the given rotational speed of the ESP 102. Specifically, the system 100 is utilized for measurement of pressure increment across the ESP 102 and to study the two-phase flow behavior at the inlet of the ESP 102 at different operating conditions. The visualization of gas and liquid flow patterns is done through photos or videos taken by the camera 162. The outcome of the experimental tests related to pressure-data and liquid-gas flow-behavior (for different operating conditions) gives an indication of degradation of pump-head as compared to manufacturer's catalogue. Such information is helpful in anticipating premature field failures before they occur and adopting corrective steps to reduce cost of operation/production and to extend the life of the equipment.

Numerous modifications and variations of the present disclosure are possible in light of the above teachings. It is therefore to be understood that within the scope of the appended claims, the invention may be practiced otherwise than as specifically described herein.

The invention claimed is:

1. A multi-phase liquid-gas flow system for testing electrical submersible pumps (ESP), comprising:
   an oil pump;
   a water pump;
   a turbine type oil flow meter (OFM);
   a turbine type water flow meter (WFM);
   a temperature sensor;
   a pressure sensor;
   an oil-air-water separator tank;
   an oil storage tank;
   a water storage tank;
   a pressurized air system;

an air pressure regulator (PR); and a transparent test section and a test pump section, wherein the test pump section comprises a pipe and an ESP test pump disposed inside the pipe;

wherein the pressurized air system comprises:
at least four air storage tanks (AT);
at least three compressors each of the compressors having a dryer (COMP+DRYER); and
at least three air flow meters (AFM);

wherein the oil storage tank is in fluid communication with the oil pump by a first valve, the oil pump is configured to pump oil from the oil storage tank through the OFM to the transparent test section by a second valve and a third valve;

the water storage tank is in fluid communication with the water pump by a fourth valve, the water pump is configured to pump water through the WFM to the transparent test section by a fifth valve and a sixth valve;

the air storage tanks are in fluid communication with the PR by a first plurality of valves configured to channel air through the PR and the AFMs to the transparent test section by a second plurality of valves;

an air stream from the AT is sent to the transparent test section by a seventh valve and an eight valve;

a camera to capture photos and videos of flow patterns in the transparent test section, wherein the camera is mounted on a rack mounted to the transparent test section and in longitudinal alignment with the transparent test section; and the ESP is mounted axially with a longitudinal axis of the transparent test section, and the test pump section is mounted downstream of the transparent test section; and the ESP has an intake and discharge at least one of which is axially aligned with the transparent test section.

2. The system of claim 1, wherein the first valve, the second valve, the fourth valve, the fifth valve, the seventh valve, and the first plurality of valves are gate valves.

3. The system of claim 1, wherein the third valve, the sixth valve, and the eighth valve are one-way valves.

4. The system of claim 1, wherein the second plurality of valves are flow control valves.

5. The system of claim 1, wherein the transparent test section is a transparent polymer cylinder.

6. The system of claim 1, wherein the transparent test section has a length of from 100 cm to 200 cm.

7. The system of claim 1, wherein the transparent test section has a diameter of from 7.5 cm to 12.5 cm.

8. The system of claim 1, wherein the ESP test pump has a diaphragm and an impulse line.

9. The system of claim 1, wherein the ESP test pump has a length of from 100 cm to 200 cm.

10. The system of claim 1, wherein the ESP test pump has a diameter of from 10 cm to 20 cm.

11. The system of claim 1, wherein the ESP test pump is connected downstream of the transparent test section and is in fluid communication with the transparent test section.

12. The system of claim 11, wherein the ESP test pump is disposed axially with regard to the transparent test section.

13. The system of claim 1, wherein the PR is configured to control an air pressure of the air stream from the AT to the transparent test section to achieve a predetermined gas volume fraction (GVF) in the transparent test section.

14. The system of claim 13, wherein the system operates at GVFs that range of from 10% to 70% per total volume of a multi-phase liquid-gas flow.

15. The system of claim 8, wherein the ESP test pump has a differential pressure transmitter.

16. The system of claim 8, wherein the impulse line runs from the submersible test pump to the diaphragm through the differential pressure transmitter.

17. The system of claim 1, wherein the transparent test section is a vertically oriented cylinder.

18. The system of claim 1, wherein the temperature sensor and the pressure sensor are disposed adjacent to the transparent test section.

19. The system of claim 1, wherein a diameter of the transparent test section is from 1.1 to 1.5 times greater than a diameter of the test pump section.

* * * * *